United States Patent
Han et al.

(10) Patent No.: US 10,301,039 B2
(45) Date of Patent: May 28, 2019

(54) STATIC DISCHARGER AND AIRCRAFT HAVING THE STATIC DISCHARGER

(71) Applicant: AIRBUS (BEIJING) ENGINEERING CENTRE COMPANY LIMITED, Beijing (CN)

(72) Inventors: Zengli Han, Beijing (CN); Yumin Sun, Beijing (CN)

(73) Assignee: AIRBUS (BEIJING) ENGINEERING CENTRE COMPANY LIMITED, Beijing (CN)

( * ) Notice: Subject to any disclaimer, the term of this patent is extended or adjusted under 35 U.S.C. 154(b) by 419 days.

(21) Appl. No.: 15/069,698

(22) Filed: Mar. 14, 2016

(65) Prior Publication Data

US 2016/0264257 A1    Sep. 15, 2016

(30) Foreign Application Priority Data

Mar. 13, 2015 (CN) .................... 2015 2 0144802 U

(51) Int. Cl.
*B08B 6/00* (2006.01)
*B64D 45/02* (2006.01)
*H02G 13/00* (2006.01)

(52) U.S. Cl.
CPC ............. *B64D 45/02* (2013.01); *H02G 13/00* (2013.01)

(58) Field of Classification Search
CPC ................................. B64D 45/02; H02G 13/00
USPC ........................................................ 361/218
See application file for complete search history.

(56) References Cited

U.S. PATENT DOCUMENTS

| | | | |
|---|---|---|---|
| 3,617,805 A | 11/1971 | Truax | |
| 4,080,643 A * | 3/1978 | Cline | B64D 45/02 361/218 |
| 4,262,321 A | 4/1981 | Cline | |
| 5,570,265 A * | 10/1996 | Smith | B64D 45/02 361/212 |
| 2005/0002145 A1 | 1/2005 | Elon | |
| 2016/0167092 A1* | 6/2016 | Gaw | B08B 1/04 244/201 |

OTHER PUBLICATIONS

European Search Report dated Jul. 19, 2016 EP Application No. 16160238.

* cited by examiner

*Primary Examiner* — Zeev V Kitov
(74) *Attorney, Agent, or Firm* — Nixon & Vanderhye P.C.

(57) ABSTRACT

The present application relates to a static discharger and an aircraft including the static discharger. According to an aspect of the present application, a static discharger is provided which includes: a basement; and a discharger body adapted to be installed to the basement. The static discharger further includes a first fixing mechanism adapted to fix the discharger body to the basement. A pivoting mechanism is provided between the basement and the discharger body, the pivoting mechanism allowing the discharger body to pivot with respect to the basement so as to adjust an installation orientation of the discharger body with respect to the basement during an on-site-installation of the static discharger. According to the present application, for example, installation adaptation and universality of the static discharger can be improved.

26 Claims, 14 Drawing Sheets

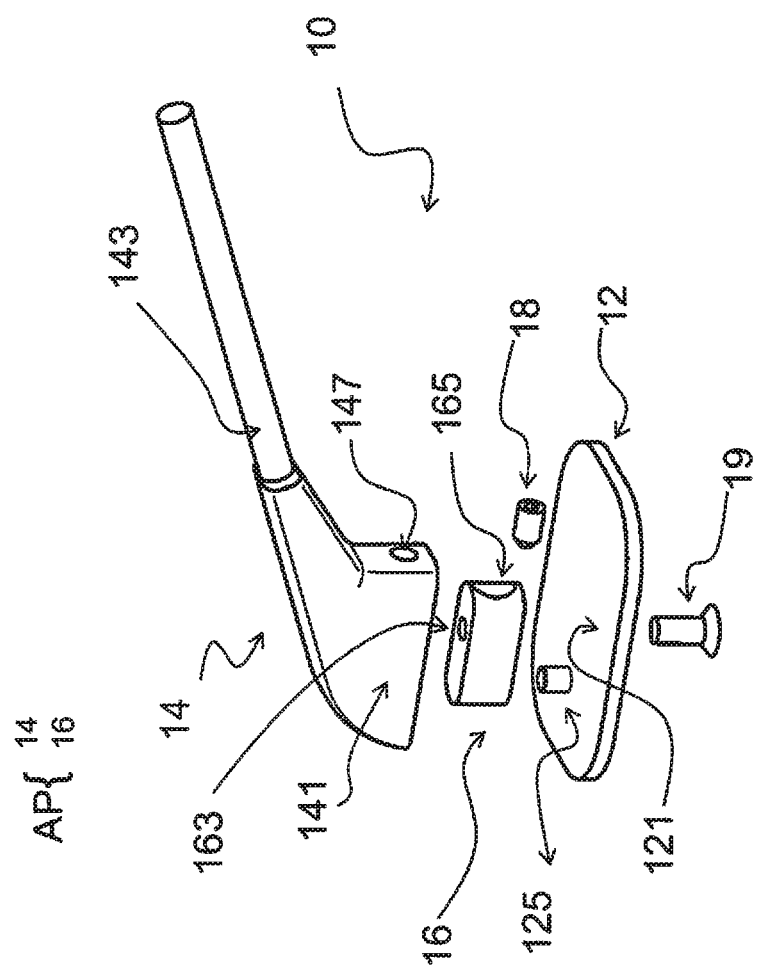

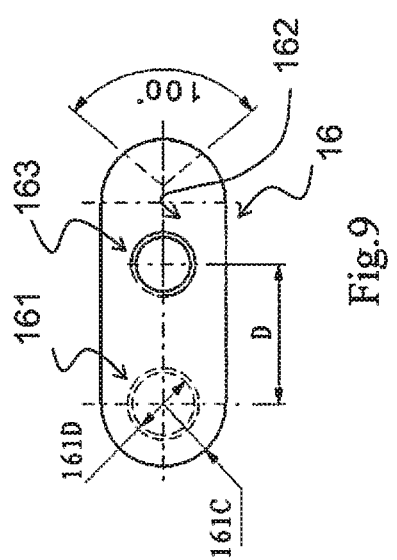

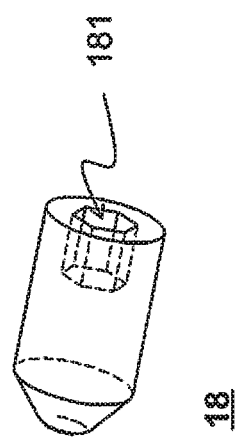

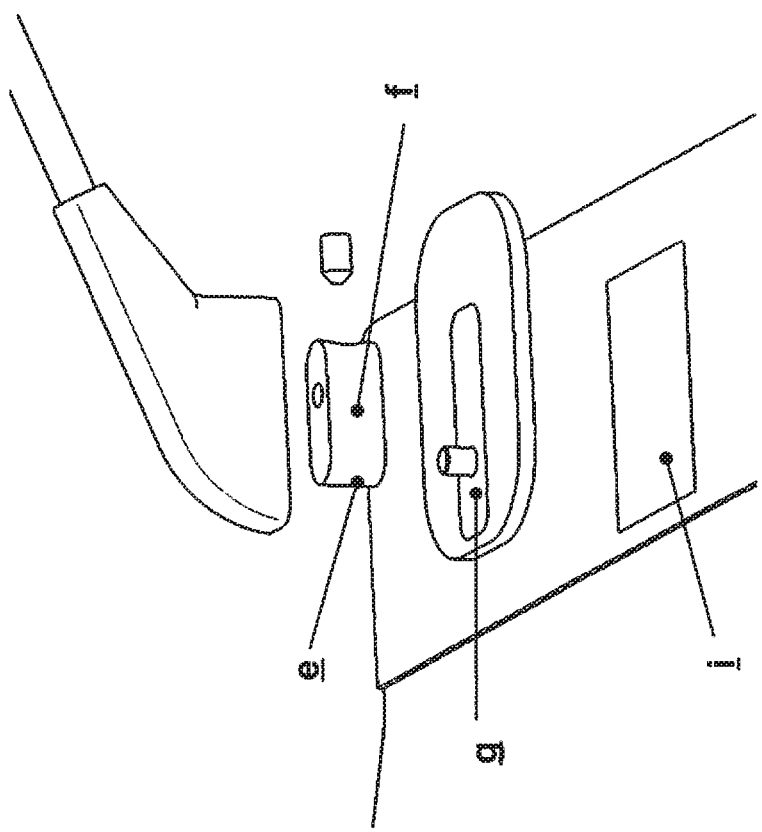

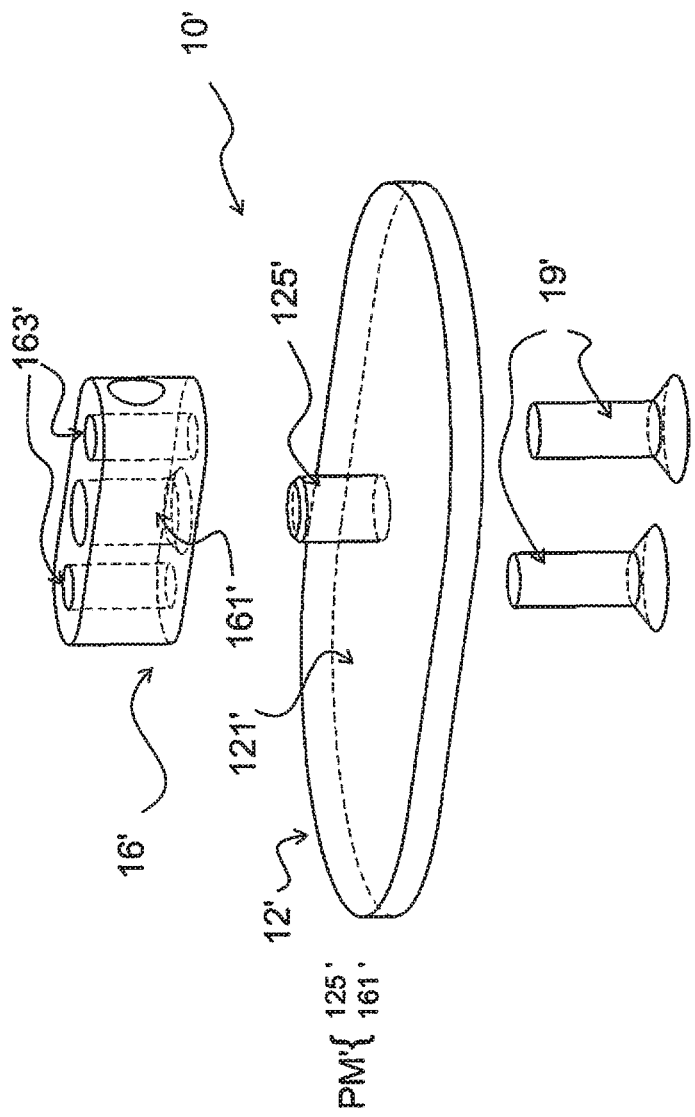

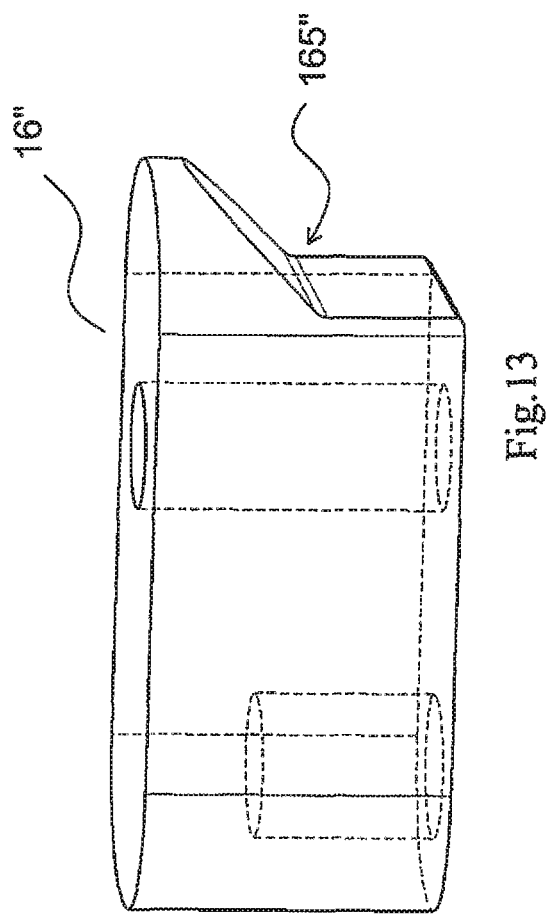

STATIC DISCHARGER AND AIRCRAFT HAVING THE STATIC DISCHARGER

RELATED APPLICATIONS

This application claims priority to Chinese Patent Application No. 201520144802.X, filed Mar. 13, 2015, which is incorporated by reference in its entirety herein.

FIELD OF THE INVENTION

The present application relates to a static discharger and an aircraft having the same, and more particularly to a static discharger improved in aspects of installation adaptation and universality and so on.

BACKGROUND OF THE INVENTION

Generally, high-speed moving bodies such as the airplane, the aerospace plane, the train and the automobile are provided with a static discharger. In particular, the static discharger is an essential component in the airplane used to protect relevant structures of the airplane by discharging the current (static electricity) to the air slowly. The static discharger may be installed at the wing (for example, a trailing edge of the outboard aileron and/or a trailing edge of the winglet), the VTP (vertical fin plane), the HTP (horizontal fin plane), the rudder and/or the elevator.

Referring to FIG. 1 (FIG. 1 is a schematic view for illustrating a situation where a static discharger according to the relevant technology is installed on a rudder of an airplane), the static discharger 10A according to the relevant technology includes a basement 12A and a discharging portion 14A. The static discharger 10A is installed on the rudder 20A (only a part of the rudder 20A is shown in FIG. 1) of the airplane. Generally, the basement 12A is a substantially rectangular plate. The discharging portion 14A is fixedly installed at or integrally formed at a transversely middle position of the basement 12A along a longitudinal direction of the basement 12A. The rudder 20A is provided, at a trailing edge 22A thereof, with a trailing edge profile member 24A which is made of metal. The trailing edge profile member 24A generally has a U-shaped cross section and is configured to envelop the trailing edge 22A of the rudder 20A (in FIG. 1, the trailing edge profile member 24A envelops the trailing edge 22A of the rudder 20A from the right side). With the basement 12A of the static discharger 10A being installed on the trailing edge profile member 24A of the rudder 20A, the static discharger 10A is mechanically fixed to the rudder 20A and at the same time conductively connected to the rudder 20A (that is, to the trailing edge profile member 24A) and thus to other relevant structures of the airplane.

On the one hand, according to the design requirements of the airplane, a width FDW of the trailing edge profile member 24A along the flight direction FD of the airplane is generally small. On the other hand. In order to ensure stable installation and sufficient electrical contact area of the static discharger 10A, the area and then the length L of the basement 12A should not be too small, and therefore, the length L of the basement 12A is generally larger than the width FDW of the trailing edge profile member 24A. On still another aspect, in order to minimize the windage caused by the discharging portion 14A and to minimize the force (the wind force) suffered by the discharging portion 14A, it is required that the discharging portion 14A be installed in a direction in line with the flight direction FD (for example, in the example shown in FIG. 1, the static discharger 10A and the discharging portion 14A thereof should be orientated in the way shown in the figure with respect to the rudder 20A).

Therefore, as shown in FIG. 1, in the static discharger 10A according to the relevant technology, in order to avoid instable installation and/or poor electrical contact caused by the condition in which the basement 12A of the static discharger 10A is directly installed to the trailing edge profile member 24A in a partially suspended manner, an additional metallic plate 30A is needed via which the static discharger 10A is installed on the rudder 20A (the metallic plate 30A is directly installed on the trailing edge profile member 24A in a partially suspended manner, and then the basement 12A is installed on the metallic plate 30A by a fastener 40A).

In this way, in the static discharger 10A according to the relevant technology, since an additional metallic plate 30A is needed for the installation, the weight is increased, the installation is complex, and the aerodynamic surface is affected. In addition, the partially suspended installations of the metallic plate 30A and the basement 12A may also affect the aerodynamic surface (which will cause turbulence effect) and cause inconvenient installation. Still another, the structure in which the discharging portion 14A is fixedly connected to or integrally formed with the basement 12A may cause a problem that the static discharger 10A (in particular, the basement 12A) cannot be flexibly adapted to the trailing edge profile member 24A of the rudder 20A which is relatively narrow, and particularly, the angles of the discharging portion 14A with respect to the basement 12A and to the rudder 20A (the trailing edge profile member 24A) cannot be flexibly adjusted based on the practical situation on the installation site, and thus it is difficulty to ensure that the discharging portion 14A is installed in line with the flight direction FD.

Referring to FIG. 2 (FIG. 2 is a schematic view which illustrates a situation where another static discharger according to the relevant technology is installed on an elevator of an airplane), the static discharger 10B according to the relevant technology may also include a basement 12B and a discharging portion 14B. The discharging portion 14B is installed on the elevator 20B.

In the static discharger 10B according to the relevant technology, similarly, a length L of the basement 12B is generally larger than a width FDW of a trailing edge profile member 24B of the elevator 20B along the flight direction FD of the airplane. As shown in FIG. 2, the static discharger 10B is installed to the elevator 20B in a manner different from the partially suspended manner shown in FIG. 1. However, in this different installing manner, it also need an additional metallic plate 30B to improve the electrical contact between the static discharger 10B and the elevator 20B (the trailing edge profile member 24B), and to fill up the intersection region 28B, which is generally concave, between the trailing edge profile member 24B of the elevator 20B and the body region 26B of the elevator 20B, to ensure stable installation of the static discharger 10B.

In this way, in the static discharger 10B according to the relevant technology, similarly, since an additional metallic plate 30B is needed for the installation, the weight is increased, the installation is complex, and the aerodynamic surface is affected. In addition, since the metallic plate 30B and the basement 12B not only are installed on the trailing edge profile member 24B but also go upward and are installed on the body region 26B of the elevator 20B (which is also called as a bestriding installation manner), the metallic plate 30B and the basement 12B protrude upward at a higher degree, which not only affect the aerodynamic surface but also cause inconvenient installation. Still another, similarly, the structure in which the discharging portion 14B is fixedly connected to or integrally formed with the basement 12B may cause a problem that the static discharger 10B (in particular, the basement 12B) cannot be flexibly adapted to the trailing edge profile member 24B of the elevator 20B which is relatively narrow, and particularly, the angles of the discharging portion 14B with respect to the basement 12B and to the elevator 20B (the trailing edge profile member 24B) cannot be flexibly adjusted based on the practical situation on the installation site, and thus it is difficulty to ensure that the discharging portion 14B is installed in line with the flight direction FD.

Herein, it is to be noted that the technical contents in this section are provided to help the person skilled in the art to understand the present application, and they do not necessarily constitute a part of the prior art.

SUMMARY OF THE INVENTION

A general concept of the present application is provided in this section, but this section does not involve a complete scope of the present application or an overall disclosure of all the features of the present application.

An object of the present application is to provide a static discharger with which an installation/assembly manner of a basement and then the whole static discharger can be determined based on the practical circumstance on the installation site.

Another object of the present application is to provide a static discharger with which a basement and then the whole static discharger can be flexibly adapted to a trailing edge profile member which is relatively narrow.

Another object of the present application is to provide a static discharger with which an angle of a discharging portion with respect to a basement and to a trailing edge profile member can be flexibly adjusted based on the practical circumstance on the installation site, thereby making it easy to ensure that the discharging portion is installed to be in line with a flight direction.

Another object of the present application is to provide a static discharger with which the universality of the static discharger can be improved and thus there is no need to prepare a series of different static dischargers for different airplane models and installation positions etc.

Another object of the present application is to provide a static discharger with which disadvantageous circumstances such as that the weight is increased, the assembly is complex and the aerodynamic surface is affected can be avoided.

Another object of the present application is to provide a static discharger with which the electrical contact can be improved.

In order to achieve one or more of the above objects, according to an aspect of the present application, a static discharger is provided including: a basement adapted to be installed to a supporting and conductive structure of a moving body; and a discharger body adapted to be installed to the basement. The static discharger further includes a first fixing mechanism adapted to fix the discharger body to the basement. A pivoting mechanism is provided between the basement and the discharger body, the pivoting mechanism allowing the discharger body to pivot with respect to the basement so as to adjust an installation orientation of the discharger body with respect to the basement during an on-site-installation of the static discharger.

In the static discharger according to the present application, the pivoting mechanism includes a protrusion and a shaft hole adapted to receive the protrusion, the protrusion protrudes out of one of the basement and the discharger body, and the shaft hole is formed at the other of the basement and the discharger body.

In the static discharger according to the present application, the discharger body includes a discharging portion and an internal-media.

In the static discharger according to the present application, the discharging portion includes a connecting portion and a tail portion.

In the static discharger according to the present application, a receiving groove is formed in a bottom portion of the connecting portion, and the receiving groove is adapted to receive the internal-media.

In the static discharger according to the present application, a shape of the receiving groove and a shape of the internal-media are configured such that the internal-media is adapted to be received in the receiving groove in a shape-matched manner so as to restrict the rotation of the discharging portion with respect to the internal-media.

In the static discharger according to the present application, the height of the internal-media is smaller than the depth of the receiving groove, so that when the discharging portion is arranged on the internal-media, there is a gap between a top surface of the internal-media and a bottom surface of the receiving groove.

In the static discharger according to the present application, the protrusion protrudes out of the basement and the shaft hole is formed at the internal-media.

In the static discharger according to the present application, the shaft hole is formed to be a blind hole, and the height of the protrusion is smaller than the depth of the shaft hole, such that when the internal-media is arranged on the basement, there is a gap between a top surface of the protrusion and a bottom surface of the shaft hole.

In the static discharger according to the present application, an inner diameter of the shaft hole and an outer diameter of the protrusion are set such that the shaft hole and the protrusion are in a small-clearance fit and that the protrusion is adapted to bear a shear load.

In the static discharger according to the present application, the protrusion protrudes upwardly from either of a first side and a second side of an upper surface of the basement, and the shaft hole is formed. In a corresponding one of a first region and a second region of a bottom portion of the internal-media.

In the static discharger according to the present application, the first fixing mechanism includes a fastening hole, and the fastening hole is formed in a substantially middle region of the internal-media or formed in one, where the shaft hole is not formed, of the first region and the second region.

In the static discharger according to the present application, the protrusion protrudes upwardly from a substantially central region of an upper surface of the basement, and the shaft hole is formed in a substantially central region of a bottom portion of the internal-media.

In the static discharger according to the present application, the first fixing mechanism includes two fastening holes, and the fastening holes are formed in the internal-media around the shaft hole.

In the static discharger according to the present application, the fastening hole is a threaded through-hole, and the first fixing mechanism further includes a countersunk bolt, and the countersunk bolt is adapted to pass through the basement to threadedly engage with the fastening hole.

In the static discharger according to the present application, the basement is a rectangular plate with rounded corners, a square plate or a circular plate.

In the static discharger according to the present application, a drilling trajectory me is denoted on at least the upper surface of the basement, the drilling trajectory line is a circular arc trajectory centered on a site, and the site corresponds to a center line of the protrusion or a center of the shaft hole, and a radius of the circular arc trajectory corresponds to a distance between the shaft hole and the fastening hole.

In the static discharger according to the present application, the first fixing mechanism further includes a bore, and a drilling position which is determined for drilling the bore during the on-site-installation is located on the drilling trajectory line.

In the static discharger according to the present application, the first fixing mechanism further includes a countersunk bolt, and the bore allows the countersunk bolt to pass through the basement and is adapted to receive a head portion of the countersunk bolt.

In the static discharger according to the present application, the static discharger further includes a second fixing mechanism adapted to fix the discharging portion to the internal-media.

In the static discharger according to the present application, the second fixing mechanism includes: an anchoring hole formed in a leeward portion of the connecting portion and being in communication with the receiving groove; a conical recess centrally formed in a leeward portion of the internal-media; and an anchoring member, and the conical recess is adapted to receive a front end of the anchoring member passing through the anchoring hole.

In the static discharger according to the present application, the second fixing mechanism includes: an anchoring hole formed in a leeward portion of the connecting portion and being in communication with the receiving groove; a cutout; and an anchoring member, and the cutout is formed by substantially vertically truncating a lower portion of a leeward portion of the internal-media and beveling an upper portion of the leeward portion of the internal-media.

In the static discharger according to the present application, the anchoring member is a self-locking screw, and a driving hole adapted to receiving a driving tool is formed in a rear portion of the anchoring member.

In the static discharger according to the present application, a windward side of the discharging portion is formed to have a streamline profile in accordance with aerodynamic characteristics.

In order to achieve one or more of the above objects, according to another aspect of the present application, an aircraft is provided. The aircraft includes the static discharger as described above.

In the aircraft according to the present application, the static discharger is provided at a trailing edge profile member, which is configured as the supporting and conductive structure, of an elevator, a rudder, an aileron of a wing and/or a winglet of the wing of the aircraft.

According to the present application, when the static discharger is taken away from the factory, the basement and the discharging portion are not fixedly assembled or integrally formed with each other. Therefore, the installation/assembly manner of the basement and then the whole static discharger can be determined on the installation site based on practical circumstances such as dimension and orientation of the trailing edge profile member of the rudder and/or the elevator of the airplane, such that the basement and then the whole static discharger can be flexibly adapted to, for example, the relatively narrow trailing edge profile member of the rudder and/or the elevator. And in particular, the angle of the discharging portion with respect to the basement and to the trailing edge profile member can be flexibly adjusted based on the practical circumstance on the installation site. Therefore, it is easy to ensure that the discharging portion is installed in line with the flight direction. Thus, the universality of the static discharger is increased, and there is no need to prepare a series of different static dischargers for different models of airplane and installation positions etc.

In addition, according to the present application, since no additional installation member such as a metallic plate is needed in the installation of the static discharger, disadvantageous circumstances such as that the weight is increased, the assembly is complex and the aerodynamic surface is affected can be avoided. Besides, the so called suspended installation manner or bestriding installation manner can be avoided since generally the basement can be completely superposed on the Bat trailing edge profile member, thus the electrical contact can be improved, the installation course can be further simplified and the affection on the aerodynamic surface can be further reduced.

BRIEF DESCRIPTION OF THE DRAWINGS

Features and advantages of one or more embodiments of be present application will be understood more readily with reference to the description in conjunction with the drawings, and wherein:

FIG. 3 is an exploded perspective view showing a static discharger according to a first embodiment of the present application;

FIG. 9 is a bottom view showing an internal-media according to the first embodiment of the present application;

FIG. 10 is a perspective view showing an anchoring member according the first embodiment of the present application;

FIG. 11A and FIG. 11B are respectively a schematic view illustrating an electrical conductivity route of the static discharger according to the first embodiment of the present application;

FIG. 12 is an exploded perspective view showing relevant components of a static discharger according to a second embodiment of the present application;

FIG. 13 is a perspective view of an internal-media according to a variation.

DETAILED DESCRIPTION

Hereinafter, the present application will be described in detail with reference to the drawings and in conjunction with the exemplary embodiments. The following detailed description is for illustration purpose only but is not intended to limit the present application and its application or usage.

Figure 4:
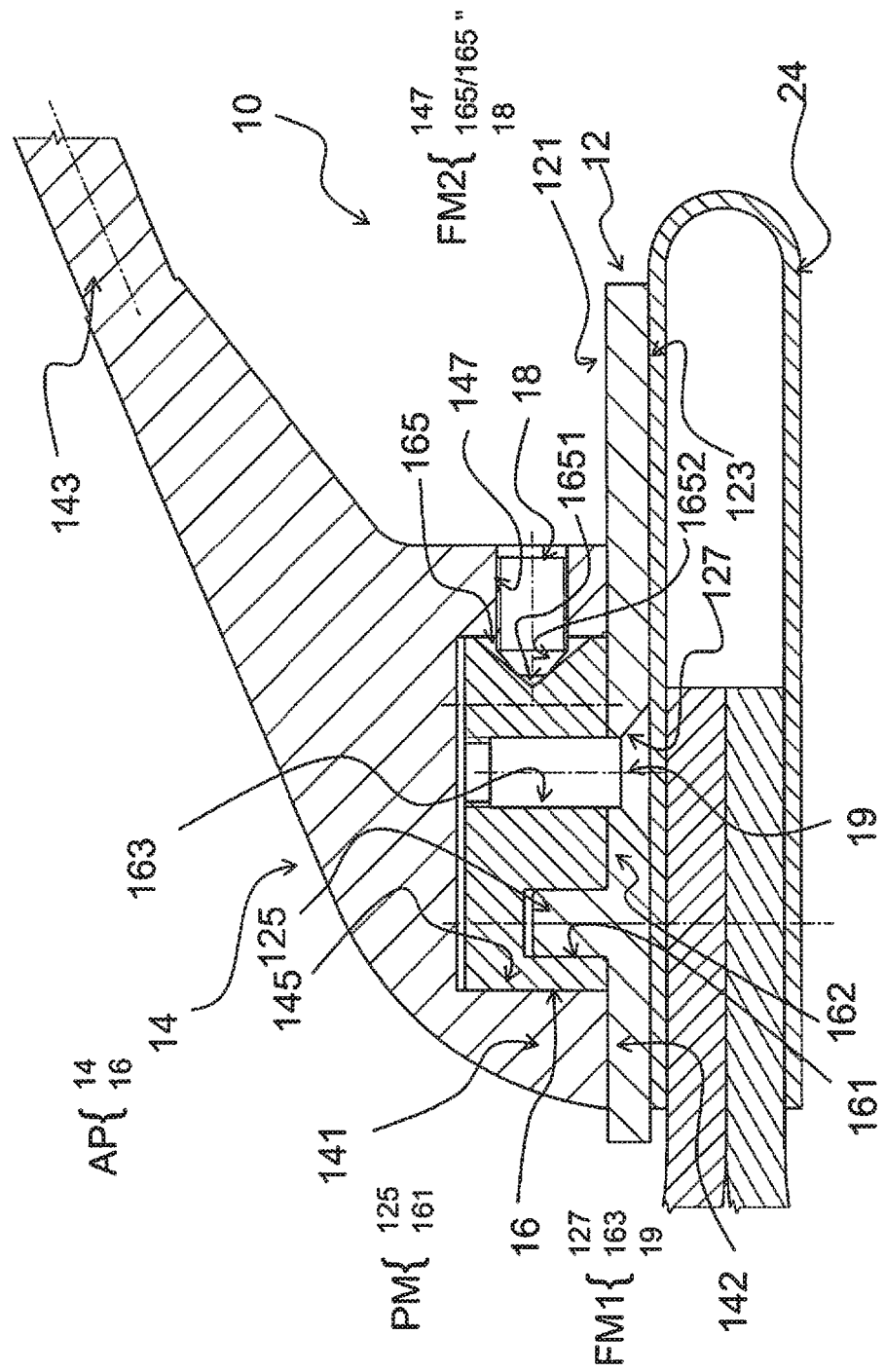
FIG. 4 is a longitudinal section view showing the static discharger according to the first embodiment of the present application.

Firstly, a static discharger 10 according to a first embodiment of the present application is described with reference to FIG. 3 and FIG. 4. FIG. 3 is an exploded perspective view showing a static discharger according to the first embodiment of the present application, and FIG. 4 is a longitudinal section view showing the static discharger according to the first embodiment of the present application.

As shown in FIG. 3, the static discharger 10 may include a basement 12, a discharging portion 14 and an internal-media 16. It is to be noted herein that the assembly of the discharging portion 14 and the internal-media 16 corresponds to a discharger body AP according to the present application.

The basement 12 may be a substantially rectangular shape plate (such as a rectangular plate with rounded corners), and is adapted to be installed (via a lower surface 123 thereof), for example, on a trailing edge profile member 24 (referring to FIG. 4) of a rudder and/or an elevator of an airplane. The flat plate configuration of the basement 12 can facilitate stable installation and electrical contact of the static discharger. Here, it is to be noted that the trailing edge profile member 24 serves as a supporting and conductive structure according to the present application.

At a front region of an upper surface 121 of the basement 12 (the left region in FIG. 3 and it may correspond to a first side according to the present application, while a rear region of the upper surface 121 may correspond to a second side according to the present application), a (circular) protrusion 125 protruding upwardly from the upper surface 121 is provided. The protrusion 125 is adapted to be inserted in a (circular) shaft hole 161 formed in a bottom portion of the internal-media 16, which will be described hereinafter.

Figure 7:
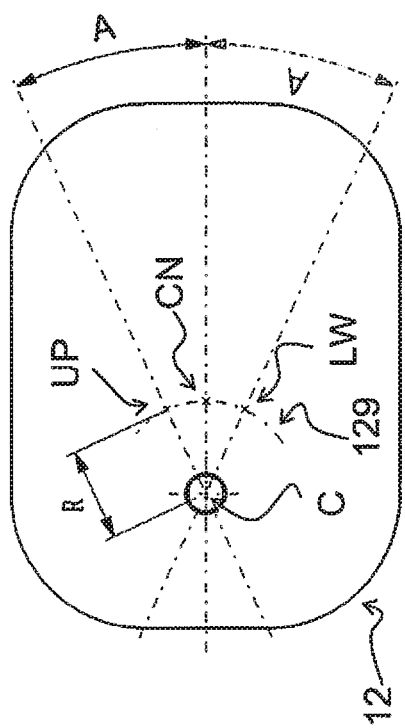
FIG. 7 is a schematic view showing bore arrangement on the basement according to the first embodiment of the present application.

In some examples, a drilling trajectory line 129 is denoted on at least the upper surface 121 of the basement 12 (referring to FIG. 7 which is a schematic view showing bore arrangement on the basement according to the first embodiment of the present application). The drilling trajectory line 129 is a circular arc trajectory (which has a radius R corresponding to a distance D between the shaft hole and a fastening hole of the internal-media 16, which will be described hereinafter) centered on a site C (which corresponds to a center line of the protrusion 125 or a center 161C of the shaft hole 161). As will be described hereinafter, the drilling trajectory line 129 facilities the determination of a position of the bore on the basement 12 to facilitate an accurate assembly/installation of the static discharger 10.

The discharging portion 14 may include a connection portion 141 and tail portion 143. A receiving groove 145 (referring to FIG. 4 and FIG. 8 which is a perspective view showing the discharging portion according to the first embodiment of the present application) is formed in a bottom portion of the connection portion 141. The receiving groove 145 is of a substantially cuboid profile and is adapted to receiving the internal-media 16.

Figure 8:
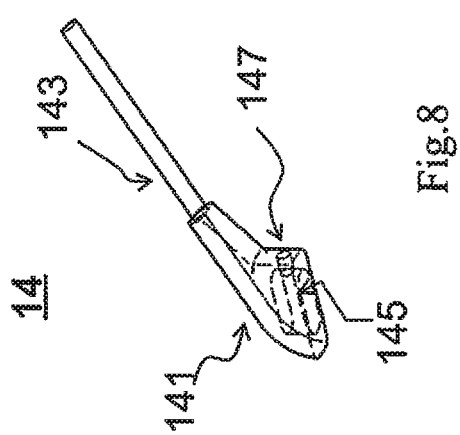
FIG. 8 is a perspective view showing the discharging portion according to the first embodiment of the present application.

An anchoring hole 147 (with or without threads) in communication with the receiving groove 145 is formed in a rear portion of the connection portion 141 (corresponding to a leeward portion according to the present application) (referring to FIG. 4 and FIG. 8). An anchoring member 18, such as a self-locking screw, may pass through the anchoring hole 147, such that a front end of the anchoring member 18 is inserted in a recess at a rear portion of the internal-media 16 to thereby fasten the discharging portion 14 to the internal-media 16 and then to the basement 12. Referring to FIG. 10 (FIG. 10 is a perspective view showing an anchoring member according to the first embodiment of the present application), a driving hole 181 may be formed in a rear portion of the anchoring member 18. The driving hole 181 is adapted to receive driving tools such as a screwing tool such that the anchoring member 18 is, for example, screwed into the recess at the rear portion of the internal-media 16.

In some examples, a front side (the left side in FIG. 3, that is, the windward side) of the discharging portion 14 which includes the connection portion 141 and the tail portion 143 is formed to have a streamline profile in accordance with the aerodynamic characteristics.

The internal-media 16 may have a substantially cuboid profile, and is adapted to be fittingly (in a shape-matched manner) received in the receiving groove 145 of the discharging portion 14. Therefore, when the discharging portion 14 is arranged on the internal-media 16, because of non-circular or polyhedral profile matching between the internal-media 16 and the receiving groove 145, the rotation of the discharging portion 14 with respect to the internal-media 16 can be reliably restricted.

In some examples, as clearly shown in FIG. 4, the height of the internal-media 16 may be (slightly) smaller than the depth of the receiving groove 145, such that when the discharging portion 14 is arranged on the internal-media 16, there is a gap between a top surface of the internal-media 16 and a bottom surface of the receiving groove 145. Thus, it can be reliably ensured that a lower surface 142 of the connecting portion 141 of the discharging portion 14 can be sufficiently in contact with the upper surface 121 of the basement 12, enhancing installation stability and improving electrical contact.

A (circular) shaft hole 161 is formed at a front region (corresponding to a first region according to the present application, and a rear region of the bottom portion corresponding to a second region according to the present application) of the bottom portion of the internal-media 16 (reference may be made to FIG. 9 which is a bottom view showing an internal-media according to the first embodiment of the present application). The shaft hole 161 is adapted to receive the (circular) protrusion 125 of the basement 12. When the internal-media 16 is arranged on the basement 12 in a state that the protrusion 125 is inserted in the shaft hole 161, the internal-media 16 can pivot about the protrusion 125 (through 360 degrees). Herein, it is to be noted that the protrusion 125 and the shaft hole 161 together constitute a pivoting mechanism PM according to the present application.

In some examples, the height of the protrusion 125 may be (slightly) smaller than the depth of the shaft hole 161, such that when the internal-media 16 is arranged on the basement 12, there is a gap between a top surface of the protrusion 125 and a bottom surface of the shaft hole 161. Therefore, it can be reliably ensured that a lower surface 162 of the internal-media 16 is sufficiently in contact with the upper surface 121 of the basement 12, enhancing installation stability and improving electrical contact. In the illustrated example, the shaft hole 161 is formed to be a blind hole, and in other examples, the shaft hole may also be formed to be a through-hole.

In some examples, an inner diameter 161D of the shaft hole 161 is set such that the shaft hole 161 and the protrusion 125 can be in a small clearance fit and that the protrusion 125 of the basement 12 is adapted to bear a shear load.

A fastening hole (a threaded hole) 163 is formed in a substantially longitudinally middle region or a rear region located more rearwardly than the middle region of the internal-media 16. In some examples, the fastening hole 163 may be a through hole, and in other examples, the fastening hole 163 may be a blind hole. A fastener 19, for example a countersunk bolt, can pass through the basement 12 to threadedly engage to the fastening hole 163, thereby fastening the internal-media 16 to the basement 12.

A recess 165 (for example, a conical recess 165) is formed at a center position of a rear portion (corresponding to a leeward portion according to the present application) of the internal-media 16. The front end of the anchoring member 18 as mentioned above may be inserted in the recess 165, to fasten the discharging portion 14 to the internal-media 16 and thus to the basement 12. The recess 165 is adapted to guide the self-tapping insertion of the anchoring member 18 such as a self-locking screw to thereby facilitate fastening the discharging portion 14 to the internal-media 16 via the anchoring member 18. Besides, the fixing structure of the discharging portion 14 and the internal-media 16 is provided at the leeward side of the static discharger 10, which thereby can sustain the intact streamline profile of the windward side of the static discharger 10 to ensure that the leeward side of the static discharger 10 is in accordance with the aerodynamic characteristics. In some examples, a taper angle of the conical recess 165 may be 100 degrees or around 100 degrees (see FIG. 9).

In a preferred example, the shaft hole 161, the fastening hole 163 and the recess 165 are aligned in a longitudinal direction of the internal-media 16 and are positioned at a transversely middle position of the internal-media 16 (as clearly shown in FIG. 9).

Hereinafter, an exemplary assembly course of the static discharger 10 according to the first embodiment of the present application and an exemplary installation course in which the static discharger 10 is installed, for example, on the trailing edge profile member 24 of the rudder and/or the elevator will be described.

According to the first embodiment of the present application, when the static discharger 10 is taken away from the factory, the basement 12 and the discharging portion 14 of the static discharger 10 are not fixedly assembled or integrally formed with each other, but is provided in an unassembled state as shown in FIG. 3. On the installation site, the installation/assembly manner of the basement 12 and then the whole static discharger 10 will be determined based on practical circumstances such as dimension and orientation of the trailing edge profile member 24 of the rudder and/or the elevator of the airplane.

Figure 2:
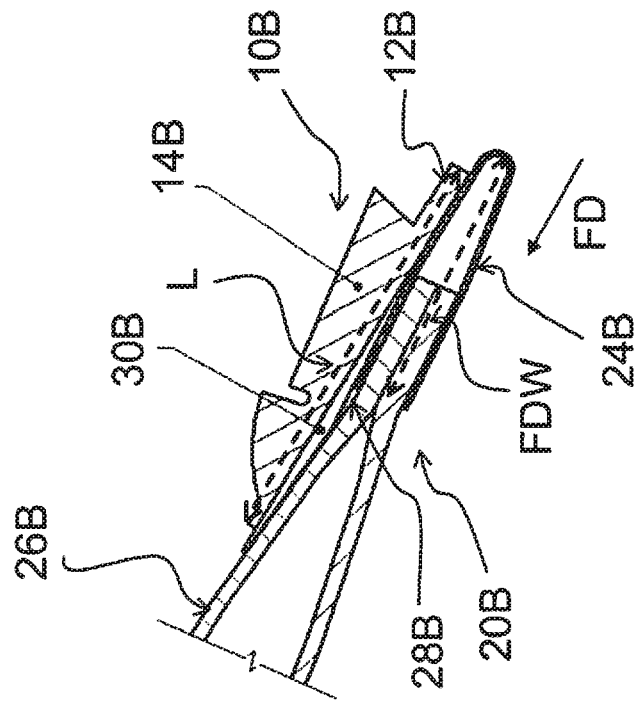
FIG. 2 is a schematic view which illustrates a situation where another static discharger according to the relevant technology is installed on an elevator of an airplane.
Figure 1:
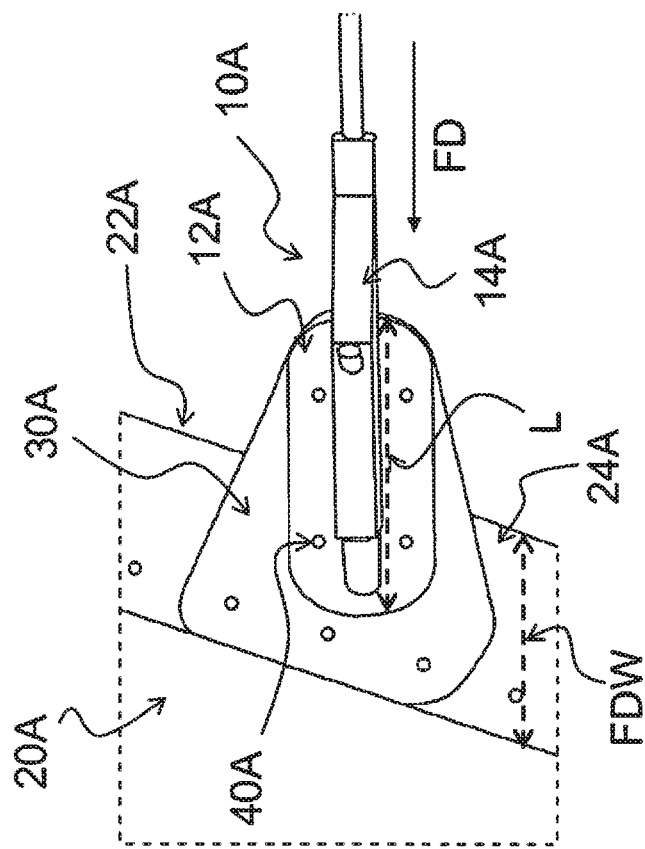
FIG. 1 is a schematic view for illustrating a situation where a static discharger according to the relevant technology is installed on a rudder of an airplane.
Figure 5:
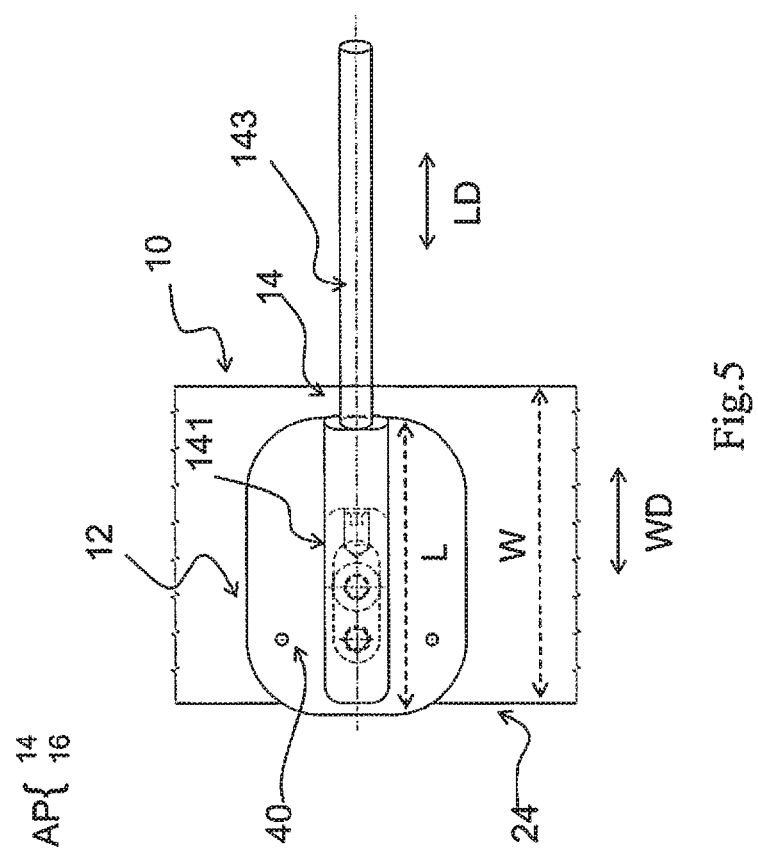
FIG. 5 is a schematic view which illustrates a situation where the static discharger according to the first embodiment of the present application is installed on a trailing edge profile member of a rudder and/or an elevator of an airplane.

In a case that a width W of the trailing edge profile member 24 is larger than or equal to a length L of the basement 12 (as shown in FIG. 5 which is a schematic view which illustrates a circumstance in which a static discharger according to the first embodiment of the present application is installed on a trailing edge profile member of a rudder and/or an elevator of an airplane), the basement 12 may be installed on the trailing edge profile member 24 in such a way that a longitudinal direction LD of the basement 12 is in line with a width direction WD of the trailing edge profile member 24. In a case that the width W of the trailing edge profile member 24 is smaller than the length L of the basement 12 (as shown in FIG. 1 which shows a situation of the relevant technology), the basement 12 may be installed on the trailing edge profile member 24 in such a way that the longitudinal direction LD of the basement 12 intersects with or even is perpendicular to the width direction WD of the trailing edge profile member 24, such that the basement 12 can be completely superposed on the (flat) trailing edge profile member 24 to thereby avoid the so called (partially) suspended installation manner or bestriding installation manner.

After a suitable installation manner of the basement 12 with respect to the trailing edge profile member 24 is determined, a suitable installation orientation of the discharging portion 14 with respect to the basement 12 is determined. It is to be noted herein that since the rotation of the discharging portion 14 with respect to the internal-media 16 is restricted, an installation orientation of the discharging portion 14 with respect to the basement 12 corresponds to that of the internal-media 16 with respect to the basement 12.

Figure 6:
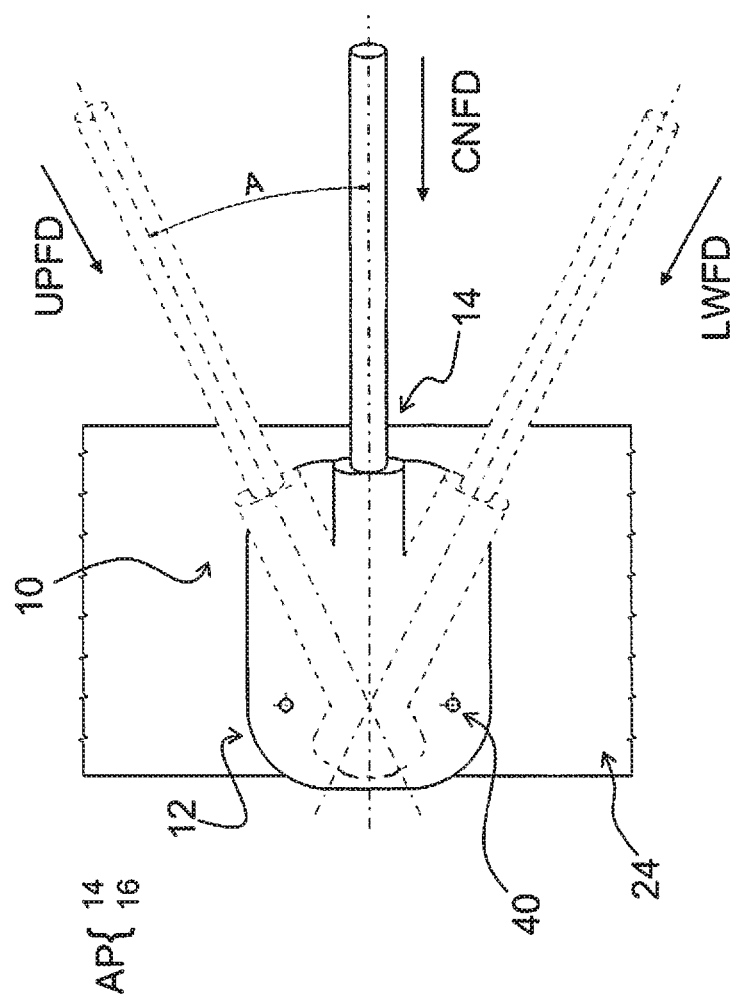
FIG. 6 is a view showing an installation orientation of the discharging portion with respect to the basement according to the first embodiment of the present application.

Herein, the circumstance as shown in FIG. 5 where the width W of the trailing edge profile member 24 is greater than or equal to the length L of the basement 12 and the basement 12 is installed in such a way that the longitudinal direction LD of the basement 12 is in line with the width direction WD of the trailing edge profile member 24 is described as an example. In the case that a flight direction FD of an airplane is exactly in line with the width direction WD of the trailing edge profile member 24 (referring to a flight direction CNFD in FIG. 6 which is a view showing an installation orientation of the discharging portion with respect to the basement according to the first embodiment of the present application), the discharging portion 14 and the internal-media 16 are oriented such that a longitudinal direction of the discharging portion 14 and the internal-media 16 is in line with a longitudinal direction LD of the basement 12. In such case, drilling is performed at a middle position CN of the basement 12 (referring to FIG. 7). In the case that the flight direction FD of the airplane deviates (upwardly or downwardly) from the width direction WD of the trailing edge profile member 24 (referring to a flight direction UPFD and a flight direction LWFD in FIG. 6 for example), the discharging portion 14 and the internal-media 16 are oriented such that the longitudinal direction of the discharging portion 14 and the internal-media 16 accordingly deviates from the longitudinal direction LD of the basement 12. In the case that the flight direction FD deviates upwardly (such as the flight direction UPFD in FIG. 6 which deviates upwardly from the flight direction CNFD by an angle A), drilling will be performed at a position UP, which deviates upwardly with respect to the middle position CN, of the basement 12 (referring to FIG. 7); and in the case that the flight direction FD deviates downwardly (such as the flight direction LWFD in FIG. 6 which deviates downwardly from the flight direction CNFD by the angle A), drilling will be performed at a position LW, which deviates downwardly with respect to the middle position CN, of the basement 12 (referring to FIG. 7). Herein, it is to be noted that the middle position CN, the upper deviating position UP and the lower deviating position LW are all located on a circular arc drilling trajectory denoted by the drilling trajectory line 129.

After an installation orientation of the basement 12 with respect to the trailing edge profile member 24 is determined, and after an installation orientation of the discharging portion 14 with respect to the basement 12 is determined (that is, after the drilling position on the basement 12 is determined), the assembly course of the static discharger 10 and the installation course for installing the static discharger 10 on the trailing edge profile member 24 can begin.

Firstly, a bore 127 is drilled in the basement 12 on the installation site (referring to FIG. 4) based on the determined drilling position (for example the middle position CN, the upper deviating position UP or the lower deviating position LW). The bore 127 allows the fastener 19 to pass through the basement 12 and is adapted to finally receive a head portion of the fastener 19.

Next, the internal-media 16 is arranged on the basement 12 such that the protrusion 125 is inserted in the shaft hole 161. Then, the internal-media 16 is pivoted about the protrusion 125, until the fastening hole 163 coincides with the bore 127. Then, the fastener 19 is passed through the bore 127 to threadedly engage to the fastening hole 163.

Next, an assembly of the basement 12 with the internal-media 16 is installed to, for example, the trailing edge profile member 24 of the rudder and/or the elevator of the airplane based on the determined installation orientation of the basement 12 with respect to the trailing edge profile member 24. In some examples, the basement 12 is fixedly connected to the trailing edge profile member 24 via fasteners 40 such as a countersunk bolt as shown in FIG. 5.

Next, the discharging portion 14 is arranged on the internal-media 16 such that the internal-media 16 is received in the receiving groove 145 of the discharging portion 14. Then, the anchoring member 18, such as a self-locking screw, is passed through the anchoring hole 147 and then inserted in the recess 165 at the rear portion of the internal-media 16, to thereby fasten the discharging portion 14 to the internal-media 16, to the basement 12 and then to the trailing edge profile member 24.

As such, the assembly/installation course of the static discharger 10 is completed.

Figure 11A:
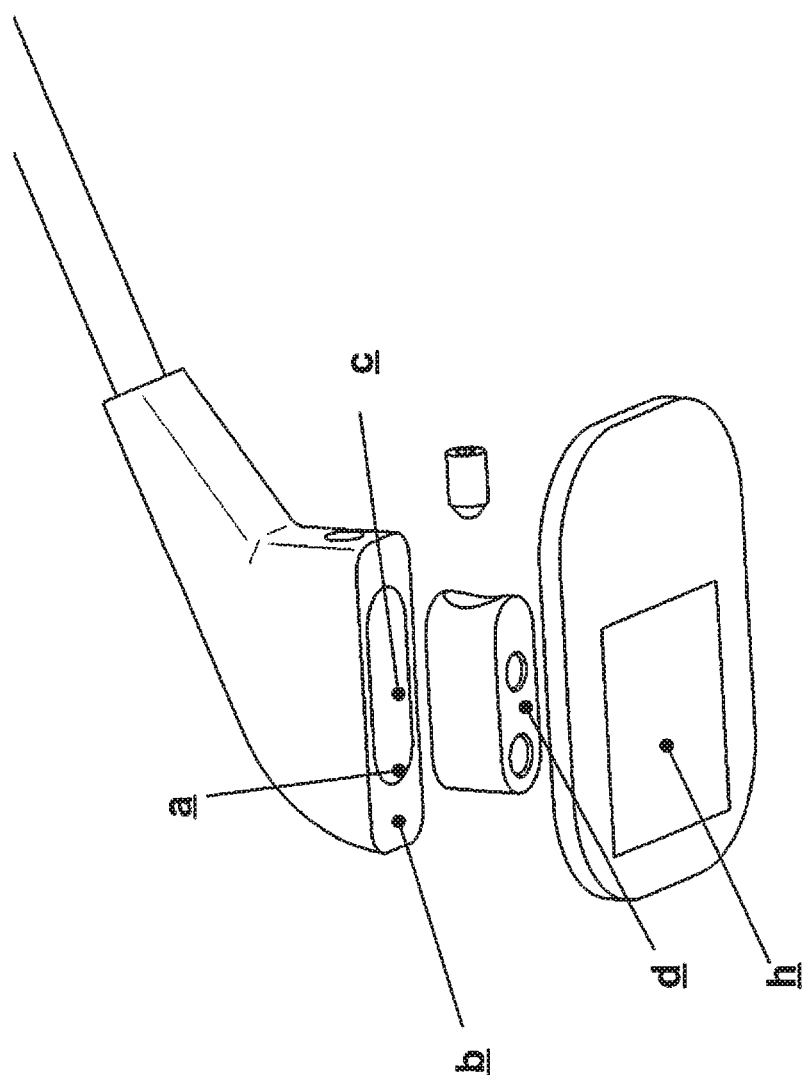

Hereinafter, an electrical conductivity route of the static discharger 10 according to an exemplary embodiment of the present application will be described with reference to FIG. 11A and FIG. 11B (FIG. 11A and FIG. 11B are respectively a schematic view illustrating an electrical conductivity route of a static discharger according to the first embodiment of the present application).

In the static discharger 10, there may be a plurality of electrical conductivity routes, which therefore can ensure an efficient static discharging. For example, the electrical conductivity routes may include a first route, a second route and a third route. The first route is: a conductive point "a" of a front wall of the receiving groove 145 of the discharging portion 14—a conductive point "e" of a front side of the internal-media 16—a conductive point "d" of the lower surface 162 of the internal-media 16—a conductive point "a" of the upper surface 121 of the basement 12—a conductive point "h" of the lower surface 123 of the basement 12—conductive point "i" of the trailing edge profile member 24. The second route is: a conductive point "b" of a lower surface 142 of the connecting portion 141 of the discharging portion 14—the conductive point "g" of the upper surface 121 of the basement 12—the conductive point "h" of the lower surface 123 of the basement 12—the conductive point "i" of the trailing edge profile member 24. The third route is: a conductive point "c" of a side wall of the receiving groove 145 of the discharging portion 14—a conductive point "f" of a lateral side of the internal-media 16—the conductive point "d" of the lower surface 162 of the internal-media 16—the conductive point "g" of the upper surface 121 of the basement 12—the conductive point "h" of the lower surface 123 of the basement 12—the conductive point "i" of the trailing edge profile member 24.

According to the first embodiment of the present application, when the static discharger is taken away from the factory, the basement and the discharging portion are not fixedly assembled or integrally formed with each other. Therefore, the installation/assembly manner of the basement and then the whole static discharger can be determined on the installation site based on practical circumstances such as dimension and orientation of the ailing edge profile member of the rudder and/or the elevator of the airplane, such that the basement and then the whole static discharger can be flexibly adapted to, for example, the relatively narrow trailing edge profile member of the rudder and/or the elevator. And in particular, the angle of the discharging portion with respect to the basement and to the trailing edge profile member can be flexibly adjusted based on the practical circumstance on the installation site. Therefore, it is easy to ensure that the discharging portion is installed in line with the flight direction. Thus, the universality of the static discharger is increased, and there is no need to prepare a series of different static dischargers for different models of airplane and installation positions etc.

In addition, according to the first embodiment of the present application, since no additional installation member such as a metallic plate is needed in the installation of the static discharger, disadvantageous circumstances such as that the weight is increased, the assembly is complex and the aerodynamic surface is affected can be avoided. Besides, the so called suspended installation manner or bestriding installation manner can be avoided since generally the basement can be completely superposed on the flat trailing edge profile member, thus the electrical contact can be improved, the installation course can be further simplified and the affection on the aerodynamic surface can be further reduced.

It should be noted herein that according to the first embodiment of the present application, even though in a certain circumstance that the basement cannot be completely superposed on the trailing edge profile member by adjusting an installation orientation of the basement with respect to the trailing edge profile member, and the employment of the so called suspended installation manner or bestriding installation manner with or without an additional metallic plate cannot be avoided, since the suspended region/bestriding region can be properly reduced and then the additional metallic plate (in case that an additional metallic plate is employed) can be properly reduced, acceptable effects which are basically the same as or similar to the above advantageous technical effects can be obtained. In particular, even though in a certain circumstance that it is necessary to employ the so called suspended installation manner or bestriding installation manner with an additional metallic plate being used, the angle of the discharging portion with respect to the basement and to the trailing edge profile member can be flexibly adjusted based on the practical circumstance on the installation site, and thus it is easy to ensure that the discharging portion is installed in line with the flight direction.

In addition, according to the first embodiment of the present application, the manner of fitting between the protrusion 125 of the basement 12 and the shaft hole 161 of the internal-media 16 and the manner of fitting between the fastener 19 and the fastening hole 163 of the internal-media 16 are appropriately designed (for example an appropriately designed fit tolerance), such that the protrusion 125 of the basement 12 is adapted to bear a shear load, and the fastener 19 is adapted to bear a tensile load, thereby effectively improving installation firmness of the static discharger 10.

Hereinafter, a static discharger 10' according to a second embodiment of the present application will be described with reference to FIG. 12. FIG. 12 is an exploded perspective view showing relevant components of a static discharger according to the second embodiment of the present application.

For the sake of simplicity, only the main differences between the second embodiment and the first embodiment will be described.

In the second embodiment, a (circular) protrusion 125' protruding upwardly from an upper surface 121' of a basement 12' is provided at a substantially central region of the upper surface 121'. Accordingly, a (circular) shaft hole 161' is formed in a substantially central region of a bottom portion of an internal-media 16'. Herein, it is to be noted that the protrusion 125' and the shaft hole 161' together constitute a pivoting mechanism PM' according to the present application.

In the second embodiment, two fastening holes (threaded holes) 163' are respectively formed on front and rear sides of the internal-media 16' with respect to the shaft hole 161'. In a preferable example, distances from the two fastening holes 163' to the shaft hole 161' are equal and are spaced apart at 180 degrees. Accordingly, two corresponding bores (not shown in the figures will be drilled on the circular arc drilling trajectory of the basement 12 on the installation site, and two corresponding fasteners 19', for example countersunk bolts, are equipped. Herein, it should be understood that the numbers of the fastening hole 163', the corresponding bores and the corresponding fasteners 19' may also each be three or more.

According to the second embodiment of the present application, technical effects similar to those of the first embodiment of the present application can be obtained. Also, according to the second embodiment, since a plurality of fastening holes 163' and a plurality of fasteners 19' are provided, the installation firmness of the static discharger 10' can be further improved.

The static discharger according to the present application may allow for many different variants.

In the above embodiment, it is described that a (conical) recess 165 is formed at the center position of the rear portion of the internal-media 16 in order to guide a self-tapping insertion of the anchoring member 18 such as a self-locking screw. However, in a variation as shown in FIG. 13 (FIG. 13 is a perspective view showing an internal-media according to the variation), a cutout 165" is formed by substantially vertically truncating a lower portion of a rear portion of the internal-media 16" and beveling an upper portion of the rear portion of the internal-media 16" (as shown in FIG. 13). In such variation, since u lower wall of the cutout 165" is a substantially vertical flat wall, compared to the above conical recess 165, the following circumstance can be avoided: in the presence of an inappropriate manufacturing error, when the discharging portion 14 is fastened to the internal-media 16 via the anchoring member 18, the discharging portion 14 is forced to deviate upwardly such that the lower surface 142 of the connecting portion 141 is not in sufficient contact with the upper surface 121 of the basement 12. Specifically, referring to FIG. 4, when the anchoring hole 147 is positioned so as to inappropriately deviate downwardly, a front end of the anchoring member 18 passing through the anchoring hole 147 is firstly brought into contact with a lower inclined wall 1652 instead of a center 1651 of the recess 165. In this way, as precession of the anchoring member 18, the front end of the anchoring member 18 is forced to move upwardly along the lower inclined wall 1652 to the center 1651, and thereby the rear portion of the connecting portion 141 of the discharging portion 14 is brought to deviate upwardly, such that the lower surface 142 of the connecting portion 141 is not in sufficient contact with the upper surface 121 of the basement 12. In addition, besides the above recess 165 and cutout 165", other suitable structures may be conceived, for example, the rear portion of the internal-media 16 has a flat rear surface.

In the above embodiment, it is described that the basement is a substantially rectangular shape plate (such as a rectangular plate with rounded corners). However, other suitable shapes of the basement may be conceived, such as, a square plate and a circular plate.

In the above embodiment, it is described that the internal-media has a substantially cuboid profile. However, other suitable profiles of the internal-media may be conceived, for example a geometry with a square or truncated circular cross-section viewed from above. In this case, the receiving groove 145 is accordingly varied to allow the internal-media to adapt to fittingly in a shape-matched manner) received in the receiving groove 145, such that the rotation of the discharging portion 14 with respect to the internal-media is reliably restricted.

In the above embodiment, it is described that a bore is drilled in the basement on the installation site. However, it can be conceived that a basement, in which a series of bores are pre-drilled along the circular arc drilling trajectory, is provided.

In the above embodiment, it is described that a protrusion is provided at the basement, and a shaft hole is provided at the internal-media. However, other arrangement, in which the position of the protrusion and the position of the shaft hole are exchanged, can be conceived.

In the above embodiment, it is described that the fastener passes through the bore of the basement to threadedly engage to the threaded fastening hole in the internal-media. However, it can be conceived that the fastening hole is a hole without threads and a nut is employed to engage with threads on a front end of the fastener. Moreover, it also can be conceived that the fastener passes through the fastening hole in the internal-media and then is threadedly engaged with a nut located below the bore of the basement.

In the above embodiment, it is described that the fixing structure of the discharging portion and the internal-media (that is, the recess/cutout and the anchoring hole and the like) is provided at the leeward side of the static discharger. However, it can be conceived that the fixing structure of the discharging portion and the internal-media can also be provided on other positions, for example, it can be provided at the front portion (the windward side) or the top portion of the connecting portion of the discharging portion. Besides, it can also be conceived that other suitable fixing structures can be employed instead of the self-locking screw fixing structure. Herein, in the situation that the anchoring hole of the discharging portion is provided on the top portion of the connecting portion of the discharging portion, the anchoring hole can vertically coincide with the shaft hole or the fastening hole, which is provided as through holes, such that the upper portion of the shaft hole or the fastening hole can be configured to receive the front end of the anchoring member. In this way, a recess or the like which is additionally provided for receiving the front end of the anchoring member can be omitted.

In the above embodiment, a structure, in which the discharging portion and the internal-media are separately formed and then are fixedly connected, is described. However, it can be conceived that the discharging portion and the internal-media are integrally formed with other. In this case, the fastening hole 19 can be formed to be a blind hole or a through hole which penetrates through the connecting portion of the discharging portion. In addition, in this case, the fixing structure of the discharging portion and the internal-media and the like can be omitted.

In the above embodiment, it is described that the static discharger is applied to the airplane. However, the static discharger according to the present application may also be applied to other aircrafts or even high-speed moving bodies such as a train and an automobile. It should be noted herein that, high-speed moving bodies such as the airplane, the aerospace plane, the train and the automobile serve as a moving body according to the present application.

Herein, it is to be noted that in the present application, the first fixing mechanism FM1 according to the present application includes the bore 127, the fastening hole 163/163' and the fastener 19, and the second fixing mechanism FM2 according to the present application includes the anchoring hole 147, the recess 165/the cutout 165', and the anchoring member 18. In addition, it can be received that other suitable means can be employed to replace the first fixing mechanism FM1 and the second fixing mechanism FM2, for example welding and adhering.

Figure 14:
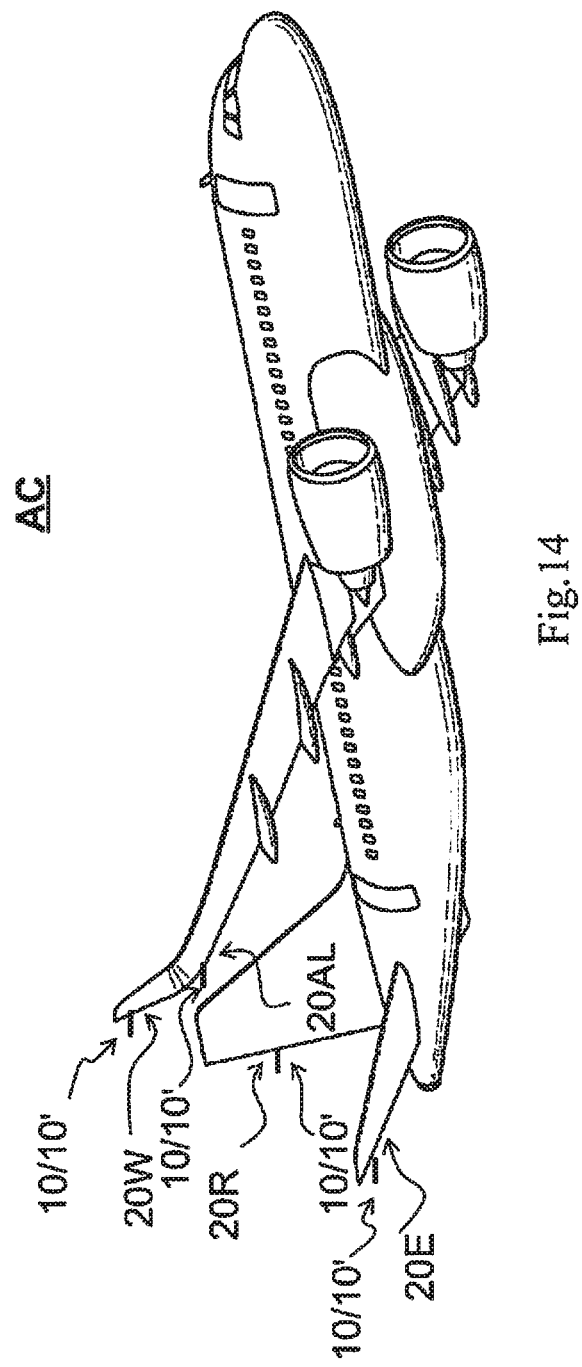
FIG. 14 is a schematic view showing an aircraft according to the present application.

In the present application, an aircraft AC (referring to FIG. 14 which is a schematic view showing an aircraft according to the present application) including the above mentioned static discharger 10, 10' is further provided. In the aircraft AC, the static discharger 10, 10' may be provided at a trailing edge (for example, a trailing edge profile member 24) of an elevator 20E, a trailing edge (for example, a trailing edge profile member 24) of a rudder 20R, a trailing edge (for example, a trailing edge profile member 24) of an aileron 20AL of the wing, or a trailing edge (for example, a trailing edge profile member 24) of a winglet 20W of the wing.

In the application documents, use of orientation terms such as "up", "down", "top", "bottom", "vertical", "transverse", "lateral" and so on, is merely for description purpose, and should not be regarded as a limitation. For example, the upper surface of the basement described in relation to a static discharger installed on an elevator is changed into a left/right side surface in the geographical sense described in relation to a static discharger installed on a rudder because the static discharger is rotated at 90 degrees. In addition, in the application documents, the orientation term "front" generally corresponds to the nose direction of the airplane and the orientation term "rear" generally corresponds to tail direction of the airplane.

In the application documents, when referring to "exemplary embodiment", "some examples", "other examples", "preferable examples", "illustrated examples" and so on, it means that detailed features, structures or characteristics described in relation to the embodiment/example are included in at least one of the embodiments/examples of the present application, and the appearance of these words in the present application does not necessarily denote the same embodiment/example. In addition, when detailed features, structures or characteristics are described in relation to any of the embodiments/examples, it should be considered that these features, structures or characteristics can also be achieved by the skilled in the art in other embodiments/examples of all of the embodiments/examples.

While the present application has been described with reference to the exemplary embodiment, it should be understood that the present application is not limited to the specific embodiments/examples described and illustrated in detail herein, and those skilled in the art can also make various modifications to the exemplary embodiment without departing from the protection scope defined by the claims.

The invention claimed is:

1. A static discharger, comprising:
a basement adapted to be installed to a supporting and conductive structure of a moving body; and
a discharger body adapted to be installed to the basement,
wherein the static discharger further comprises a first fixing mechanism adapted to fix the discharger body to the basement, and
a pivoting mechanism is provided between the basement and the discharger body, the pivoting mechanism allowing the discharger body to pivot with respect to the basement so as to angularly adjust an installation orientation of the discharger body with respect to a horizontal surface plane of the basement during an on-site-installation of the static discharger.

2. A static discharger, comprising:
a basement adapted to be installed to a supporting and conductive structure of a moving body; and
a discharger body adapted to be installed to the basement,
wherein the static discharger further comprises a first fixing mechanism adapted to fix the discharger body to the basement, and
a pivoting mechanism is provided between the basement and the discharger body, the pivoting mechanism allowing the discharger body to pivot with respect to the basement so as to adjust an installation orientation of the discharger body with respect to the basement during an on-site-installation of the static discharger,
wherein the pivoting mechanism comprises a protrusion and a shaft hole adapted to receive the protrusion, the protrusion protrudes out of one of the basement and the discharger body, and the shaft hole is formed at the other of the basement and the discharger body.

3. The static discharger according to claim 2, wherein the discharger body comprises a discharging portion and an internal-media.

4. The static discharger according to claim 3, wherein the discharging portion comprises a connecting portion and a tail portion.

5. The static discharger according to claim 4, wherein a receiving groove is formed in a bottom portion of the connecting portion, and the receiving groove is adapted to receive the internal-media.

6. The static discharger according to claim 5, wherein a shape of the receiving groove and a shape of the internal-media are configured such that the internal-media is adapted to be received in the receiving groove in a shape-matched manner so as to restrict the rotation of discharging portion with respect to the internal-media.

7. The static discharger according to claim 5, wherein the height of the internal-media is smaller than the depth of the receiving groove, so that when the discharging portion is arranged on the internal-media, there is a gap between a top surface of the internal-media and a bottom surface of the receiving groove.

8. The static discharger according to claim 5, wherein the protrusion protrudes out of the basement and the shaft hole is formed at the internal-media.

9. The static discharger according to claim 8, wherein the shaft hole is formed to be a blind hole, and
the height of the protrusion is smaller than the depth of the shaft hole, such that when the internal-media is arranged on the basement, there is a gap between a top surface of the protrusion and a bottom surface of the shaft hole.

10. The static discharger according to claim 8, wherein an inner diameter of the shaft hole and an outer diameter of the protrusion are set such that the shaft hole and the protrusion are in a small-clearance fit and that the protrusion is adapted to bear a shear load.

11. The static discharger according to claim 8, wherein the protrusion protrudes upwardly from either of a first side and a second side of an upper surface of the basement, and the shaft hole is formed in a corresponding one of a first region and a second region of a bottom portion of the internal-media.

12. The static discharger according to claim 11, wherein the first fixing mechanism comprises a fastening hole, and the fastening hole is formed in a substantially middle region of the internal-media or formed in one, where the shaft hole is not formed, of the first region and the second region.

13. The static discharger according to claim 8, wherein the protrusion protrudes upwardly from a substantially central region of an upper surface of the basement, and the shaft hole is formed in a substantially central region of a bottom portion of the internal-media.

14. The static discharger according to claim 13, wherein the first fixing mechanism comprises two fastening holes, and the fastening holes are formed in the internal-media around the shaft hole.

15. The static discharger according to claim 12, wherein the fastening hole is a threaded through-hole, and the first fixing mechanism further comprises a countersunk bolt, and the countersunk bolt is adapted to pass through the basement to threadedly engage with the fastening hole.

16. The static discharger according to claim 1, wherein the basement is a rectangular plate with rounded corners, a square plate or a circular plate.

17. The static discharger according to claim 12, wherein
a drilling trajectory line is denoted on at least the upper surface of the basement,
the drilling trajectory line is a circular arc trajectory centered on a site, and the site corresponds to a center line of the protrusion or a center of the shaft hole, and
a radius of the circular arc trajectory corresponds to a distance between the shaft hole and the fastening hole.

18. The static discharger according to claim 17, wherein the first fixing mechanism further comprises a bore, and a drilling position which is determined for drilling the bore during the on-site-installation is located on the drilling trajectory line.

19. The static discharger according to claim 18, wherein the first fixing mechanism further comprises a countersunk bolt, and the bore allows the countersunk bolt to pass through the basement and is adapted to receive a head portion of the countersunk bolt.

20. The static discharger according to claim 5, wherein the static discharger further comprises a second fixing mechanism adapted to fix the discharging portion to the internal-media.

21. The static discharger according to claim 20, wherein
the second fixing mechanism comprises: an anchoring hole formed in a leeward portion of the connecting portion and being in communication with the receiving groove; a conical recess centrally formed in a leeward portion of the internal-media; and an anchoring member, and
the conical recess is adapted to receive a front end of e anchoring member passing through the anchoring hole.

22. The static discharger according to claim 20, wherein
the second fixing mechanism comprises: an anchoring hole formed in a leeward portion of the connecting portion and being in communication with the receiving groove; a cutout; and an anchoring member, and
the cutout is formed by substantially vertically truncating a lower portion of a leeward portion of the internal-media and beveling an upper portion of the leeward portion of the internal-media.

23. The static discharger according to claim 21, wherein the anchoring member is a self-locking screw, and a driving hole adapted to receiving a driving tool is formed in a rear portion of the anchoring member.

24. The static discharger according to claim 3, wherein a windward side of the discharging portion is formed to have a streamline profile in accordance with aerodynamic characteristics.

25. An aircraft, wherein the aircraft comprises the static discharger according to claim 1.

26. The aircraft according to claim 25, wherein the static discharger is provided at a trailing edge profile member, which is configured as the supporting and conductive structure, of an elevator, a rudder, an aileron of a wing and/or a winglet of the wing of the aircraft.

* * * * *